United States Patent [19]
Moll

[11] Patent Number: 5,868,467
[45] Date of Patent: Feb. 9, 1999

[54] SEATING FURNITURE COMPONENT OR THE LIKE WITH A COUPLED BACKREST AND SEAT ADJUSTMENT

[75] Inventor: Reiner Moll, Schwäbisch-Gmünd, Germany

[73] Assignee: Thomas Jungjohann, Ertingen, Germany

[21] Appl. No.: 910,151

[22] Filed: Aug. 13, 1997

[30] Foreign Application Priority Data

Aug. 28, 1996 [DE] Germany ............. 196 34 665.7

[51] Int. Cl.$^6$ ............. A47C 1/02; A47C 1/12
[52] U.S. Cl. ............. 297/317; 297/316
[58] Field of Search ............. 297/317, 316, 297/319, 340, 300.1, 300.4

[56] References Cited

U.S. PATENT DOCUMENTS

| | | | |
|---|---|---|---|
| 4,362,336 | 12/1982 | Zapf et al. | 297/317 |
| 4,685,730 | 8/1987 | Linguanotto | 297/316 |
| 4,732,424 | 3/1988 | Uredat-Neuhoff | 297/317 |
| 5,308,145 | 5/1994 | Koepke et al. | 297/316 X |
| 5,636,898 | 6/1997 | Dixon et al. | 297/316 |

FOREIGN PATENT DOCUMENTS

| | | |
|---|---|---|
| 0 156 814 | 2/1988 | European Pat. Off. . |
| 0 393 232 | 3/1993 | European Pat. Off. . |
| 23 61 767 | 6/1973 | Germany . |
| 25 24 568 | 12/1976 | Germany . |
| 27 23 709 | 11/1978 | Germany . |
| 80 25 516 | 1/1981 | Germany . |
| 30 33 953 | 5/1981 | Germany . |
| 31 10 111 | 9/1982 | Germany . |
| 85 34 420 | 3/1986 | Germany . |
| 75 98 733 | 7/1986 | Germany . |
| 93 11 345 | 11/1993 | Germany . |
| 44 05 653 | 8/1994 | Germany . |
| 94 15 493 | 1/1995 | Germany . |
| WO 95/25452 | 9/1995 | WIPO . |

*Primary Examiner*—Peter M. Cuomo
*Assistant Examiner*—Rodney B. White
*Attorney, Agent, or Firm*—Sixbey, Friedman, Leedom & Ferguson; David S. Safran

[57] ABSTRACT

A seating furniture component, especially an upholstered furniture component with coupled backrest and seat adjustment, with a support chassis (2), with a backrest (4) adjustably attached to the support chassis (2), and with a seat (5) adjustably attached to the support chassis (2), as well as connection mechanism (6) for synchronous adjustment of the backrest (4) and seat (5) relative to the support chassis (2). The backrest (4) executes a tiltback and lowering motion relative to the support chassis (2) essentially as a pivoting motion around a pivot axis which is in the angle formed by the backrest (4) and seat (5) in front of the backrest (4) and above the seat (5). The seat (5) executes a corresponding but minor movement in the form of a superimposed sliding and lifting motion.

18 Claims, 7 Drawing Sheets

SEATING FURNITURE COMPONENT OR THE LIKE WITH A COUPLED BACKREST AND SEAT ADJUSTMENT

BACKGROUND OF THE INVENTION

1. Field of the Invention

The invention relates to a seating furniture component or the like, especially an upholstered furniture component with a coupled backrest and seat adjustment. It as well covers sittable reclining furniture, for example, an upholstered recliner with height-adjustable back part or a corresponding hospital bed. Particularly, the invention relates to such a furniture component with a support chassis, a backrest adjustably attached to the support chassis, a seat adjustably attached to the support chassis, an adjustment mechanism between the support chassis, backrest and seat which accomplishes synchronous adjustment of the backrest and seat, the backrest executing a superimposed tiltback and lowering motion from the highest upright position, i.e., the sitting position, into the lowest extended position, i.e., the reclining position, relative to the support chassis, the seat executing a slight motion from the sitting position to the reclining position, preferably a superimposed sliding and lifting motion, and preferably with a reset spring being provided.

2. Description of Related Art

Variously comfortable and variously complex seating furniture components (armchair, upholstered armchair, easy chair, bus, railroad and aircraft seat, reclining furniture with height adjustable back part), especially upholstered furniture components, in which the backrest adjustment and seat adjustment are coupled are known in the prior art. For example, published International Application WO95/25452 discloses a chair with a reclinable backrest of the type to which the teachings of this invention are applicable and provides a good outline of the generally known prior art.

First of all, in the seating furniture component disclosed in the noted Application WO95/25452 (FIGS. 1 & 2), the backrest forms an angularly-rigid unit with the seat which is attached to a support frame so as to pivot about an axis located under the seat, such that the backrest tilts back and down when leaning backwards into the reclining position, while the back end of the seat swings down and the front end swings up. This is normally done against the force of a reset spring. Here, the angularly-rigid connection of the backrest and seat adjustment is disruptive, and therefore, there is no extended position of the backrest and seat. In addition, it is disruptive that the front edge of the seat is moved considerably upward in the reclining position, this is not especially beneficial for the legs of the user.

An alternate construction of the seating furniture component shown in application WO95/25452 (FIG. 3 & 4) is a relatively common one in which the support chassis is made frame-like. The backrest is pivotally connected to the rear part of the frame-like support chassis a considerable distance above the connection point of the backrest to the rear edge of the seat. The rear edge of the seat is thus supported by means of the backrest on the support chassis. On or near the front edge, the seat is guided in a slide guide which has only a slight upward inclination, so that the front edge of the seat moves forward, but only slightly up in the transition from the sitting position to the reclining position.

In the aforementioned system, a user can move relatively easily and without expending a large amount of force into different positions between the sitting position and reclining position by shifting his body weight. It is generally necessary to use an additional braking means to be able to maintain a certain desired position, or a balancing spring means.

One disadvantage in the seating furniture component results from the pivot connection of the backrest and the seat roughly at the vertex of the angle of the two components. The connection of the two components is structurally simple, but the two components generally carry upholstered supports. The upholstered surfaces of the upholstered supports used by the user are thus somewhat above the seat or in front of the backrest and thus somewhat above or in front of the pivot axis between the backrest and seat. This results in the fact that, in the transition from the sitting position to the reclining position, the upholstered supports move away from one another; this results in a "shirt pullout effect" which the user perceives as very unpleasant.

Another problem which is likewise the result of the aforementioned pivot connection is that a "hole" forms in the pelvis/back area at the angle vertex in the transition from the sitting position into the reclining position. This "hole" is disruptive when it is too large since the pelvis/flank area is then no longer properly supported in the reclining position.

Finally, the attachment of the seat to the front edge must be carefully done so that an overly great blow into the hollows of the knee of the user does not occur in the transition from the sitting position to the reclining position.

Attempts have already been made in the prior art to eliminate the "shirt pulling effect" by providing a connection mechanism between the backrest and the seat, in the area of the rear edge or lower edge, which places the axis of the pivot connection between the backrest and seat roughly where the surfaces of the two upholstered supports abut one another in the sitting position. This is done by flaps which project from the respective frame on the edge side and which are joined to pivot with one another only on their free ends (FIGS. 5 & 6 of WO95/25452).

Analysis of this known seating furniture component has shown that, as before, the "shirt pullout effect" is noticeable when a relatively extended reclining position is desired. In addition, the "hole" in the pelvis/back area is still too large. Finally, the embodiment of the above explained prior art results in major lifting of the front edge of the seat takes place. This may be acceptable for a seat with footrests, but this is not the case for a seating furniture component of the type under consideration which generally has a foldable footrest.

SUMMARY OF THE INVENTION

A primary object of the invention is to embody and develop seating furniture components or the like of the type described above with a backrest and seat adjustment such that the "shirt pulling effect" becomes as small as possible or is completely eliminated.

The aforementioned object is achieved in a seating furniture component or the like, especially an upholstered furniture component with coupled backrest and seat adjustment, having a support chassis, a backrest adjustably attached to the support chassis, a seat adjustably attached to the support chassis, a connection mechanism between the support chassis, backrest, and seat which produces a synchronous adjustment of the backrest and seat, the backrest executing a superimposed tiltback and lowering motion from the highest upright position, i.e., the sitting position, into the lowest extended position, i.e., the reclining position, relative to the support chassis, the seat executing a slight motion from the sitting position to the reclining position, preferably, a superimposed sliding and lifting motion, and preferably, a reset spring being provided, by the backrest executing a tiltback and lowering motion via an essentially pivoting motion around a pivot axis which is within the angle of the backrest and seat in front of the backrest and above the seat.

It has been analyzed that, in the sitting position, it is inherent in this seating furniture component that an individual when sitting correctly is always roughly in the same position on the seat with his hip. Where exactly this position is, of course, depends on different influence factors, for example, the height of the upholstered support, weight of the individual, his body size and build—male or female. However, for the most part, it can be stated that the fulcrum of the body of the user will always be located in a relatively narrow area above the seat and in front of the backrest.

Proceeding from the above explained analysis, it was then analyzed how a change in length in the surface of the upholstered support on the backrest relative to the hip fulcrum of the user can be avoided in the transition from the sitting into the reclining position. This change of length is the cause of the above explained "shirt pullout effect". Of course, the user remains sitting on the seat in the transition from the sitting into the reclining position, he does not slip forward and back, consequently, an effort must be made for the back of the user on the surface of the upholstered support of the backrest not to change its position.

It has, furthermore, been ascertained that the desired result is achieved when the backrest executes, as a tiltback and lowering motion, an essentially pivoting motion around a pivot axis which is within the angle of the backrest and seat, in front of the backrest and above the seat. This pivot axis indeed is the pivot axis for the pivoting motion of the backrest, and not the pivot connection between the backrest and the seat provided in the prior art, which does not exist in the seating furniture component as claimed in the invention.

Studies have shown that the pivot axis should be between 70 mm and 180 mm in front of the unupholstered backrest and between 50 mm and 170 mm above the unupholstered seat. Thus, the region of the location of the hip fulcrum of a normal user is reached, so that the pivot axis is, as desired, roughly at the hip fulcrum of a normal user. It is also important that the pivot axis of the backrest is at a distance above or in front of the upholstered surfaces of the upholstered supports, even if, for very soft upholstered supports, optionally due to considerable sinking of the user's body, the pivot axis is occasionally even nearer the plane of the unloaded upholstered supports.

The teaching of the invention can be accomplished in two different ways. The first possibility is that the backrest is joined to pivot joints attached at the height of the pivot axis to the support chassis. But, structurally, this is not the optimum position since, thus, the connection points must be physically formed on the support chassis which are above the seat and in front of the backrest. This requires a correspondingly bulky support chassis, which, in turn, is not optimum for reasons of freedom of design.

A second embodiment is optimum in which the connection mechanism produces the pivot motion of the backrest around a pivot axis which is present only virtually. Within the connection mechanism various possibilities can be accomplished for effecting the pivot motion of the backrest without a pivot axis being physically present and for having the swivel axis present only virtually. In this case, cleverly designed connecting rod guides are likewise conceivable as cranks guides.

In accordance with the teaching of this invention, it must be considered that the hip fulcrum of a user remains essentially unchanged relative to the seat in the transition from the sitting position to the reclining position (and vice versa), while, however, according to the teaching of the invention, the seat itself shifts slightly. Without displacement of the seat, no force can be applied by the user to the structure by the weight shifting for purposes of coupled backrest and seat adjustment. When the seat is shifted very slightly in the transition from the sitting position to the reclining position, the pivot axis for the backrest can be considered as being locally static. If the displacement of the seat is greater, the swivel axis of the backrest must, itself, shift according to the displacement of the seat.

The further teaching that the adjustment mechanism is included in a separately saleable coupling brace is of special independent importance. With a correspondingly compact configuration of the adjustment mechanism, which can be accomplished in accordance with the invention, this has the great advantage that this special coupling brace can be implemented as an independent saleable part.

These and further objects, features and advantages of the present invention will become apparent from the following description when taken in connection with the accompanying drawings which, for purposes of illustration only, shows a single embodiment in accordance with the present invention.

DETAILED DESCRIPTION OF THE PREFERRED EMBODIMENT

Figure 1:
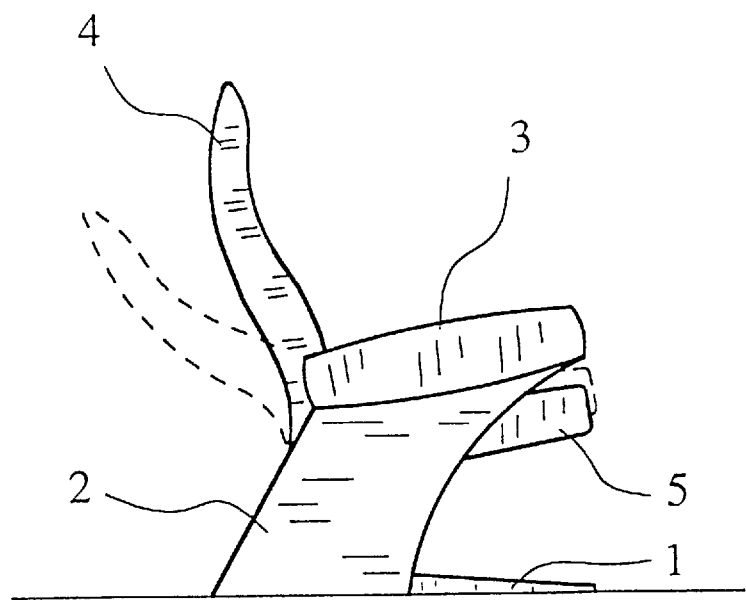
FIG. 1 is a highly schematic side view of a seating furniture component, the sitting position shown by solid lines, and the reclining position by broken lines.

The seating furniture component or the like which is shown in the drawings and which is schematically explained relative to FIG. 1 is generally, and according to a preferred embodiment, an upholstered furniture component. However, this does not mean that it cannot, fundamentally, also be built without upholstered supports, for example, as lawn seating furniture component of plastic or wood. As has been detailed above, the invention relates to seating furniture components in the most general meaning of the term; therefore, any components with seat and backrest adjustably coupled for positional adjustment is encompassed. Consequently, such seating furniture components can be, for example, armchairs, upholstered armchairs, easy chairs, as well as bus, railroad and aircraft seats, two or three seat sofas, and optionally, also reclining furniture on which it is possible to sit, such as hospital beds having a height-adjustable back part or corresponding upholstered recliners.

FIG. 1 shows, first of all, a seating furniture component which has a coupled backrest and seat adjustment with a support chassis 2 with which the seating furniture component stands on a floor 1 and with thickly upholstered armrests 3 on the support chassis 2. Backrest 4 and seat 5, accordingly, are adjustably attached to the support chassis 2.

FIG. 1 shows the sitting position of the backrest 4 and seat 5 by solid lines, while the reclining position of the backrest 4 and seat 5 are represented in broken lines. For a better understanding reference should be made to FIG. 2 and FIGS. 5 through 8 which show different positions.

First of all, the seating furniture component has connection mechanism 6 between the support chassis 2, backrest 4, and seat 5, which accomplishes synchronous adjustment of the backrest 4 and seat 5.

The backrest 4 executes a superimposed tiltback and lowering motion relative to support chassis 2 from the highest upright position, i.e., the sitting position, into the lowest extended position, i.e., the reclining position. This is clearly illustrated in FIG. 1 and is otherwise described in detail in the prior art.

Seat 5 executes only a slight motion from the sitting position to the reclining position, especially a much slighter motion than backrest 4, in the preferred embodiment shown, as also known in the prior art, with a superimposed sliding and lifting motion. Lifting motion of seat 5, in the transition from the sitting position to the reclining position, leads to the result that the shifting of the user's weight in the attempt to sit upright again into the sitting position is used for pressing seat 5 down by the higher weight of the user and thus again righting backrest 4, optionally supported by the reset spring. That this does not work at all without any displacement of seat 5 in this type of seating furniture components with a coupled backrest and seat adjustment is obvious.

Hip fulcrum 7 of the body of an average sitting individual, shown in FIGS. 5 through 8, is logically in a certain position in front of backrest 4 and above seat 5 when sitting correctly. As has been explained in the Background part of this description, hip fulcrum 7 shifts only a little or not at all relative to seat 5 in the transition from the sitting position to the reclining position. As noted above, a primary object of the present invention is to achieve a correspondingly small displacement relative to backrest 4 as well.

Here, it is provided that backrest 4 executes, as the tiltback and lowering motion, essentially a pivoting motion around pivot axis S, which lies in front of the backrest 4 and above the seat 5 within the angle formed by the backrest 4 and seat 5. The pivoting motion of the backrest 4 is illustrated by a double arrow which shows the two possible directions of motion.

In this embodiment, the pivot axis S coincides with the hip fulcrum 7. This is the optimum according to the teaching of this invention. However, in fact, since there are so many different users, only an approximation of the hip fulcrum 7 position can be used for the position of the pivot axis S. Therefore, it is provided that pivot axis S is between 70 mm and 180 mm in front of the unupholstered backrest 4 and is between 50 mm and 170 mm above the unupholstered seat 5.

It has been explained above that, for a more dramatic displacement of seat 5, it is feasible for the swivel axis S, itself, to shift according to the displacement of the seat 5. This shift is relatively minor as compared to the displacement of backrest 4, but it optimizes the motion of the seating furniture component.

Overall, the result is that the "shirt pullout effect" mentioned above, essentially, no longer occurs in this seating furniture component. At the same time, the displacement capacity of backrest 4 and seat 5 in the transition from the sitting position to the reclining position, and vice versa, is possible with extraordinary ease, without a major expenditure of force.

It has already been pointed out in the Background part of the description that there are two possibilities for implementing the pivot axis S for the backrest 4. The first possibility is not explained in detail; it applies to the latter that the backrest 4 is joined to pivot joints attached at the height of pivot axis S to support chassis 2. This approach is simple in structural terms, but has two major defects. First of all, it is not possible to accomplish a displacement capacity of axis S according to the displacement of the seat which is desirable for optimization of the teaching. Secondly, the swivel joints, which are then necessarily present above seat 5 on support chassis 2, are disruptive. Support chassis 2 then necessitates a size which limits the design freedom of the designer of the seating furniture component in an undesirable manner.

Therefore, in this embodiment, it is preferred that connection mechanism 6 executes the pivoting motion of the backrest 4 around pivot axis S which, itself, is only virtually present. This virtually present pivot axis S can be largely freely handled by an appropriately clever configuration of the connection mechanism 6.

It was mentioned above that the connection mechanism 6 can be configured in quite different ways. For virtual implementation of the pivot axis, generally, a crank guide makes sense. This can be done in this case. A host of other design solutions is conceivable. But, the embodiment shown implements a connection rod coupling since connection mechanism 6, here, has a plurality of linking connection rods.

Figure 2:
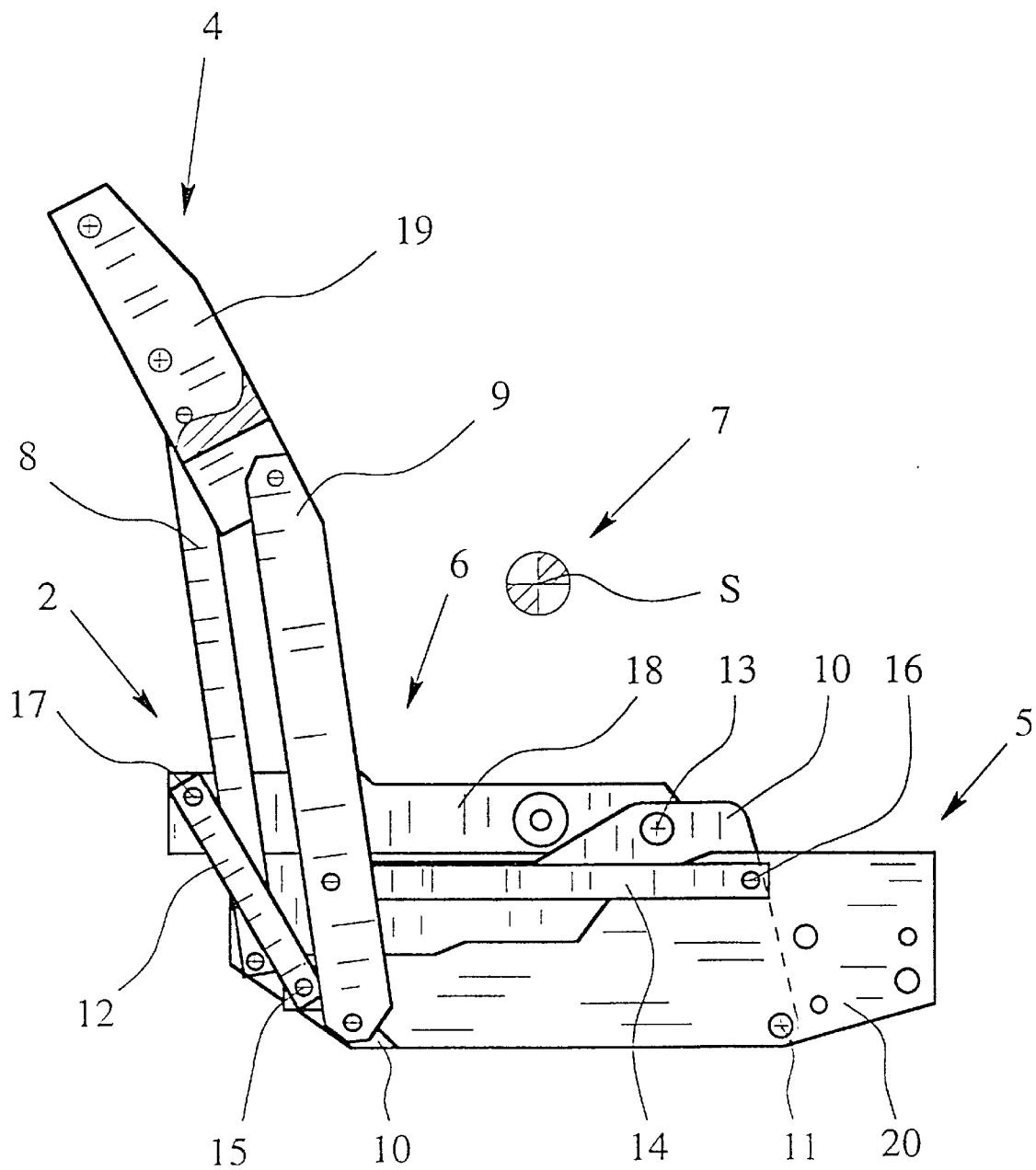
FIG. 2 shows the adjustment mechanism of the seating furniture component in an enlarged view (relative to FIG. 1) in the sitting position.

In particular it is preferred, as explained using FIG. 2, that the backrest 4 is joined via two backrest connecting levers 8, 9 to a main connecting lever 10 which, in turn, is joined to pivot on support chassis 2. Backrest connecting levers 8, 9 together with the backrest 4 and the connection points 4a, 4b spaced there, as well as the spaced connection points 10a, 10b on main connecting lever 10, can form an irregular rectangle. What is shown, however, is characterized by the fact that backrest connecting levers 8, 9 with backrest 4 and main connecting rod 10 form a connecting lever parallelogram. FIGS. 5 through 8 show what special motion can be accomplished with this parallelogram shape. Other effects can be achieved with a different constellation of connecting points.

Furthermore, in this embodiment, it is provided that the seat 5 is joined to a connecting lever attached to support chassis 2 at a support chassis coupling point 13 on one side, especially to the main connecting lever 10, and on the other side, to support chassis 2 at a support chassis coupling point 17 in a distance from the main connecting lever coupling point 11, via seat connecting lever 12. It is preferably provided that the connecting line between the main connecting lever coupling point 11 and the support chassis coupling point 13 of main connecting lever 10 runs only roughly parallel to seat connecting lever 12. This special configuration yields the motion of seat 5 which is shown in FIGS. 5 through 8, whereby the seat 5 is lifted only very slightly and pushed forward. Coupling of the motion of backrest 4 and seat 5 takes place not only via main connecting lever 10, but also by the seat 5 being coupled to the backrest connecting lever 9 via linking connecting lever 14. The linking connecting lever 14 establishes an unambiguous assignment of the inclined position of seat 5 to backrest 4 which otherwise depends on how the individual is positioned on seat 5.

In the embodiment, it is provided that the linking connecting lever 14 is joined to seat 5 at a distance from the main connecting lever coupling point 11 and from seat connecting lever coupling point 15. The embodiment shown in FIG. 2 illustrates that the linking connecting lever coupling point 16 on seat 5 is clearly above main connecting lever coupling point 11 and at a considerable lateral distance from the seat connecting lever coupling point 15, and also above it. In fact, a connecting lever parallelogram is formed from the lower part of right backrest connecting lever 9, the main connecting lever 10, the linking connecting lever 14 and seat 5. Therefore, the seat 5 is coupled to the backrest 4 via two coupled connecting lever parallelograms.

Figure 3:
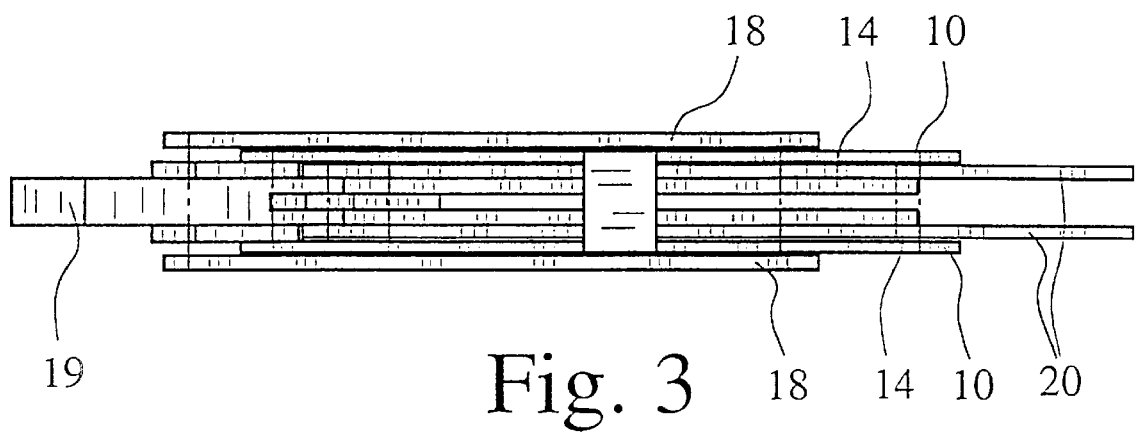
FIG. 3 is a plan view of the adjustment mechanism of FIG. 2.
Figure 4:
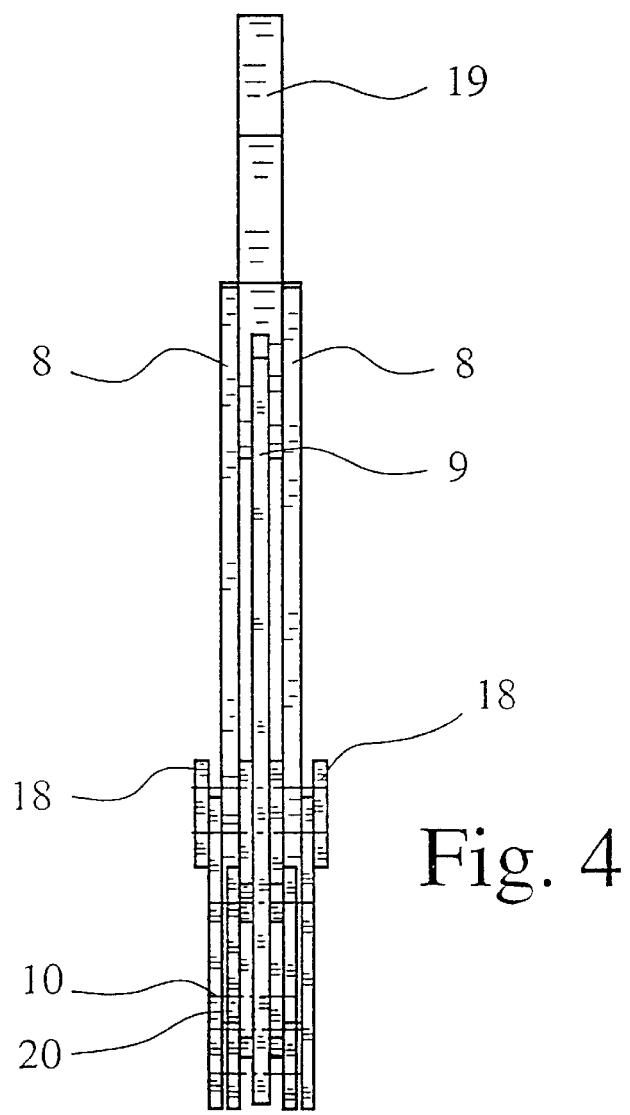
FIG. 4 shows a front elevational view of the adjustment mechanism of FIG. 2, i.e., a view from the left in FIG. 2.
Figure 5:
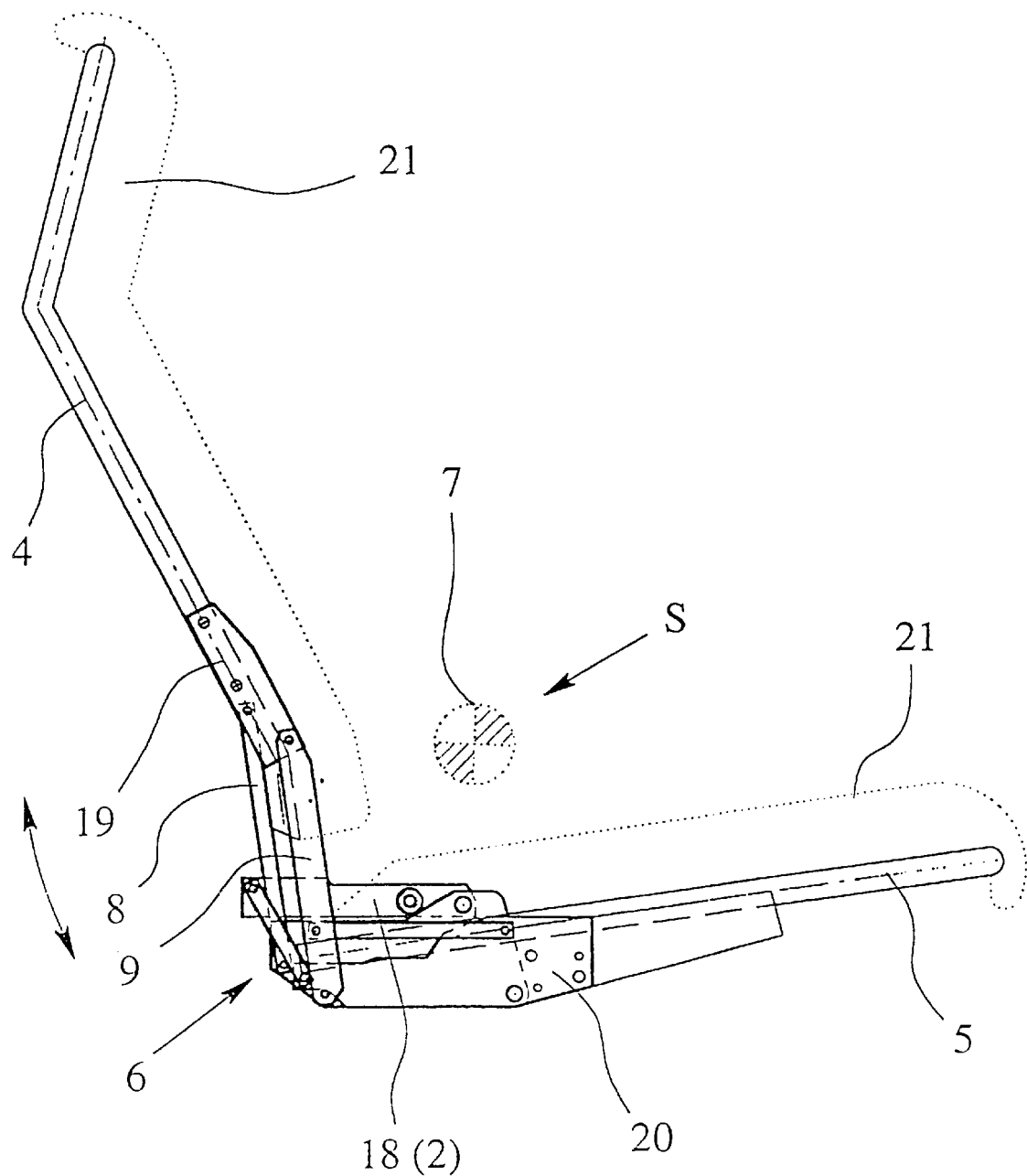
FIG. 5 shows a seating furniture component with upholstered supports illustrated by a dotted line, however without an external support chassis, in the sitting position.
Figure 6:
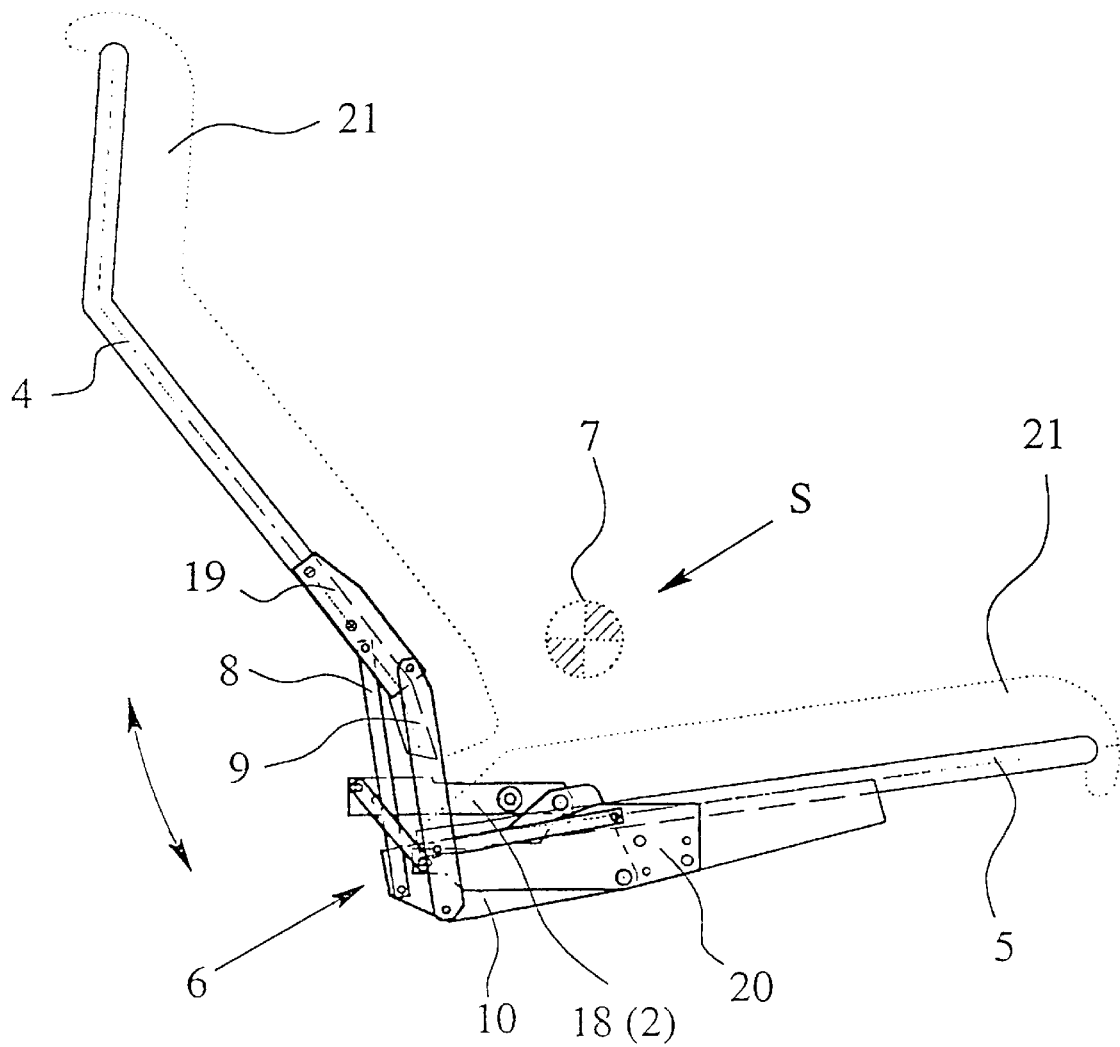
FIG. 6 shows the seating furniture component of FIG. 5 in a slightly tilted-back sitting position.
Figure 7:
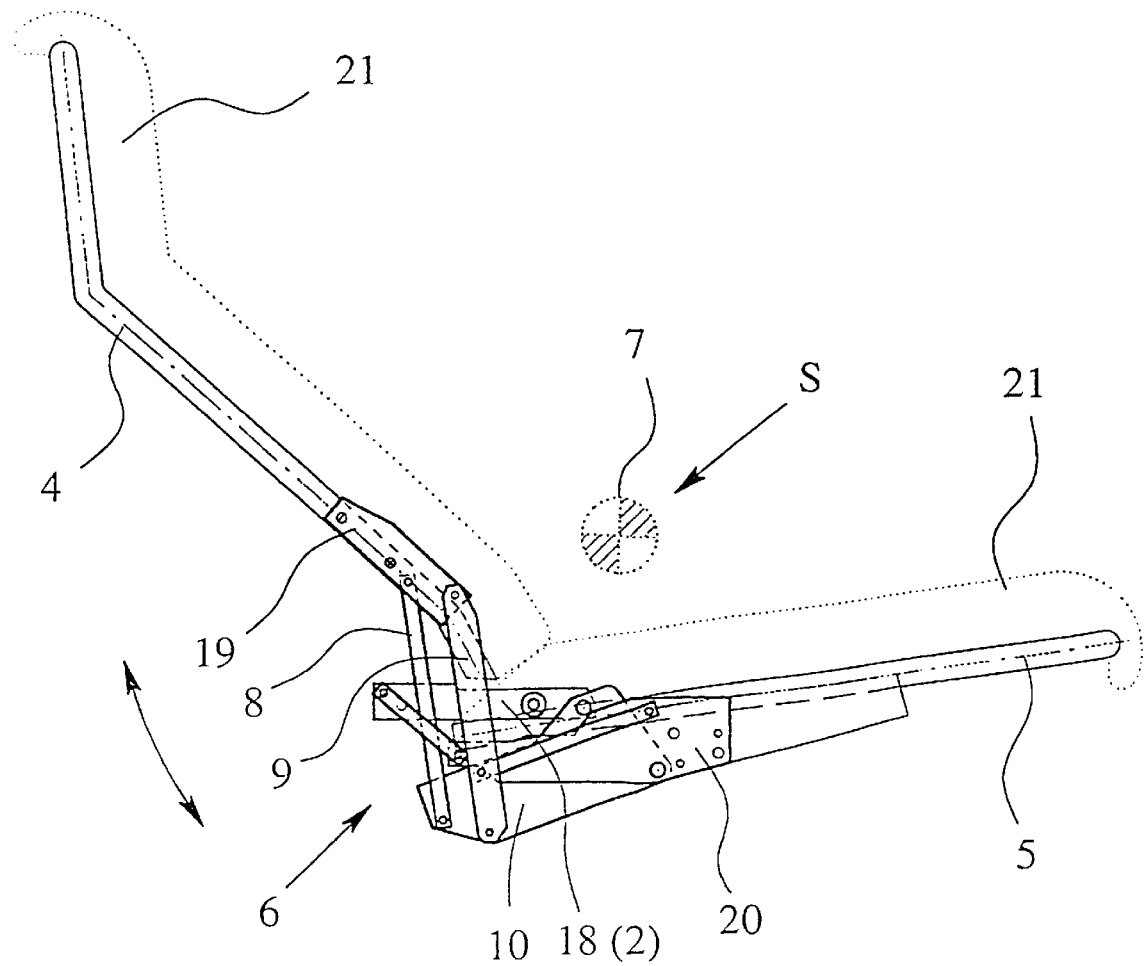
FIG. 7 shows the seating furniture component of FIG. 5 in a slightly raised reclining position.
Figure 8:
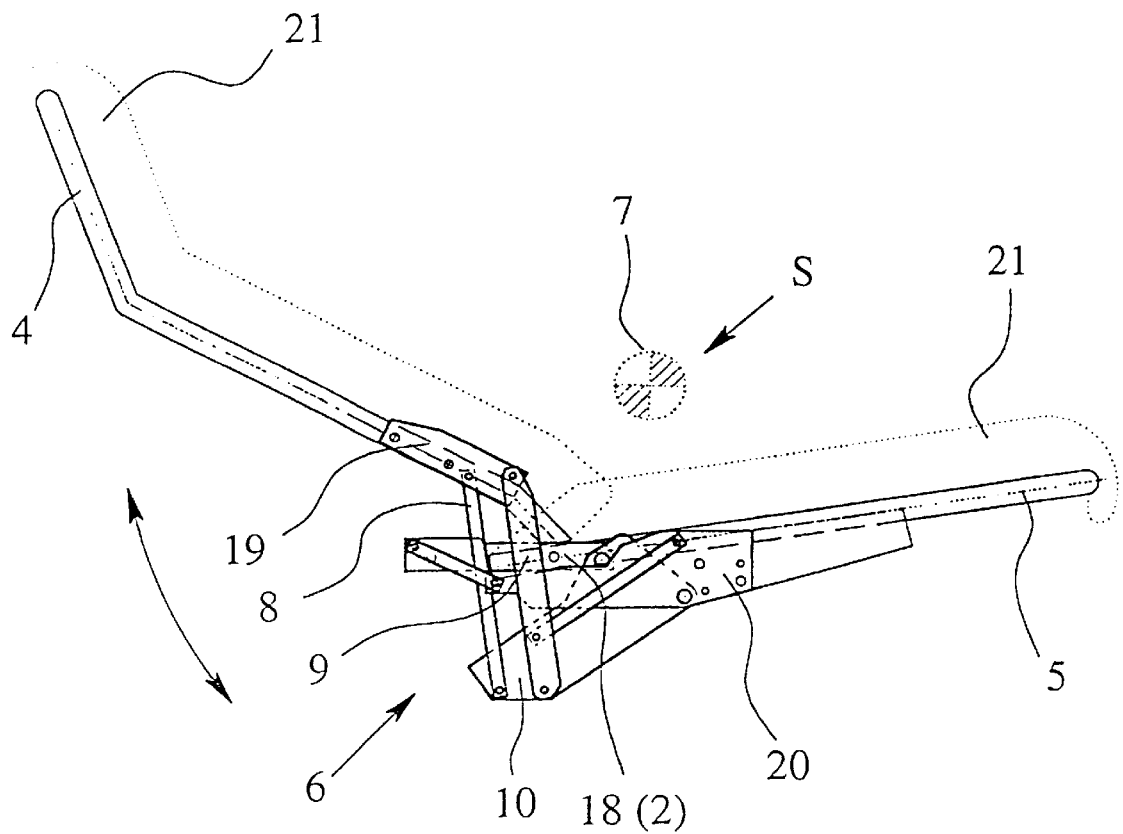
FIG. 8 shows the seating furniture component of FIG. 5 in the fully reclining position.

FIGS. 3 and 4 illustrate that in the embodiment, for reasons of the absorption and transfer of force, individual or all connecting levers are made as double connecting levers. The views in FIGS. 3 and 4, furthermore, illustrate how these different connecting levers lie in different planes in symmetric pairs.

The drawing does not show a reset spring, which is known in the prior art and which is also implemented in the invention by being integrated into the connection mechanism 6.

It is especially preferably to integrate the support chassis coupling points 13 and 17 into the support chassis mounting carrier 18 which is made here as a mounting plate. This mounting plate 18 is also made as a double plate, as FIGS. 3 and 4 indicate.

Support chassis coupling points 13, 17 are pushed so near to one another that an arrangement in very close proximity can be accomplished; this allows concentration in mounting plate 18.

As clearly shown in FIG. 2 and FIGS. 5 through 8, it is provided that all backrest coupling points are integrated in backrest mounting carrier 19 and actual backrest 4 is removably attached to backrest mounting carrier 19. FIG. 2 shows only the mounting holes 19a for the backrest 4 on backrest mounting carrier 19, while FIGS. 5 through 8 show the backrest 4 mounted thereto. The corresponding applies to seat 5; therefore it holds that all seat coupling points 20a are integrated into the seat mounting carrier 20 and the actual seat 5 is removably attached to the seat mounting carrier 20.

The implementation of backrest mounting carrier 19 and the seat mounting carrier 20 has the great advantage that entire connection mechanism 6 can be used as a universal component for seating furniture components, and therefore, can be equipped with different backrests 4 and seats 5. FIGS. 5 to 8 show upholstered supports 21 on the backrest 4 and on the seat 5 by dotted lines.

The embodiment illustrates that, as a result of the innovative construction, an especially compact design has been achieved. It has been accomplished that all connecting levers and coupling points are near the vertex of the angle between the backrest 4 and the seat 5, specifically in the sitting position, preferably, over an area 15 to 40 cm square.

The drawing does not show that it is possible for the connection mechanism 6 to be surrounded by a housing from which only backrest mounting carrier 19 and seat mounting carrier 20 movably project.

The special importance of the integrated design of connection mechanisms 6 is that, in the inventive seating furniture component, a major advantage is gained over the known seating furniture components by the connection point of the backrest to the support chassis being located, not above the connection point of the backrest to the seat, but far below it. This is also done via a lever mechanism, a knee joint connection accomplishing an addition superimposed tilting motion of the backrest. The seat itself is joined to pivot near its front edge on the support chassis at a considerable distance from the connection point of the backrest to the support chassis. Since this connection point is near the front edge of the seat, the front edge of the seat is raised less than in the seating furniture components known from the prior art when the seating component is shifted from the sitting position into the reclining position.

Finally, FIG. 2 shows that the teaching of the invention is implemented in a coupling brace for a seating furniture component in which all support chassis coupling points 10a, 10b, 17 are integrated into the support chassis mounting carrier 18, all backrest coupling points are integrated into the backrest mounting carrier 19 and all seat coupling points are integrated into the seat mounting carrier 20. This coupling brace is optimized by the housing indicated above, from which only backrest mounting carrier 19 and seat mounting carrier 20 movably project and which otherwise is equipped with attachment means for attaching inner support chassis mounting carrier 18 to support chassis 2.

For the sake of completeness, it should be noted that, normally, two connection mechanisms 6 are attached to support chassis 2, one on the right and one on the left of the backrest 4 and the seat 5 to support the backrest 4 and seat 5 between themselves. Furthermore, it should be noted that the sliding and lifting motion of the of the front edge of seat 5 can be accomplished by a slide-displacement guide or also by a connecting lever displacement guide, as is extensively known from the prior art.

While a single embodiment in accordance with the present invention have been shown and described, it is understood that the invention is not limited thereto, and is susceptible to numerous changes and modifications as known to those skilled in the art. Therefore, this invention is not limited to the details shown and described herein, and includes all such changes and modifications as are encompassed by the scope of the appended claims.

We claim:

1. Seating furniture component with coupled backrest and seat adjustment, comprising:

a support chassis;

a backrest adjustably attached to the support chassis;

a seat adjustably attached to the support chassis;

a connection mechanism connected between the support chassis, the backrest and the seat which comprises a means for synchronous adjustment of the backrest and seat in a manner causing the backrest to execute a superimposed tiltback and lowering motion relative to the support chassis from a highest upright sitting position into a lowest extended reclining position and the seat to execute a slight superimposed sliding and lifting motion from the sitting position to the reclining position;

wherein a pivot axis is provided about which the backrest executes said tiltback and lowering motion as an essentially pivoting motion around said pivot axis which is in front of the backrest and above the seat within an angle formed between the backrest and the seat; and wherein said pivot axis is a virtual axis resulting from the connection mechanism comprising a plurality of connecting levers which produce the pivoting motion of the backrest.

2. Seating furniture component as claimed in claim 1, wherein the pivot axis is between 70–180 mm in front of an unupholstered backrest and between 50–170 mm above an unupholstered seat.

3. Seating furniture component as claimed in claim 1, wherein the pivot axis, itself, shifts with displacement of the seat.

4. Seating furniture component as claimed in claim 1, wherein the backrest is joined to the support chassis by pivot joints which are at a height corresponding to that of said pivot axis.

5. Seating furniture component as claimed in claim 1, wherein said connecting levers comprise two backrest connecting levers and a main connecting lever; wherein the backrest is joined to the main connecting lever by said two backrest connecting levers; and wherein the main connecting lever is pivotally connected to the support chassis.

6. Seating furniture component as claimed in claim 5, wherein the backrest connecting levers together with the backrest and the main connecting lever form a connecting lever parallelogram.

7. Seating furniture component as claimed in claim 5, wherein the seat is joined to the main connecting lever attached to the support chassis on one side, and on another side to the support chassis at a distance from a main connecting lever coupling point via a seat connecting lever.

8. Seating furniture component as claimed in claim 7, wherein a connecting line between the main connecting lever coupling point and a support chassis coupling point of the main connecting lever runs roughly parallel to the seat connecting lever.

9. Seating furniture component as claimed in claim 8, wherein all connecting levers and coupling points are near a vertex of the angle between the backrest and the seat.

10. Seating furniture component as claimed in claim 9, wherein all connecting levers and coupling points, in the sitting position, are located in an area of about 15 to 40 cm square.

11. Seating furniture component as claimed in claim 10, wherein the pivot axis is between 70–180 mm in front of an unupholstered backrest and between 50–170 mm above an unupholstered seat.

12. Seating furniture component as claimed in claim 5, wherein the seat is joined to one of the two backrest connecting levers via a linking connecting lever.

13. Seating furniture component as claimed in claim 12, wherein the linking connecting lever is joined to the seat at a distance from a coupling point at which the main connecting lever is attached to the seat and from a seat connecting lever coupling point.

14. Seating furniture component as claimed in claim 1, wherein at least some of said connecting levers are double connecting levers.

15. Seating furniture component as claimed in claim 1, wherein the support chassis is provided with a number of support chassis coupling points and all support chassis coupling points are integrated into a support chassis mounting carrier.

16. Seating furniture component as claimed in claim 1, wherein all coupling points for the backrest are integrated in a backrest mounting carrier to which the backrest is removably attached.

17. Seating furniture component as claimed in claim 1, wherein all coupling points for the seat are integrated in a seat mounting carrier to which said seat is removably attached.

18. Coupling brace for insertion between a support chassis of a backrest and seat of seating furniture having a coupled backrest and seat adjustment, said coupling brace comprising:

a connection mechanism comprising a plurality of levers, each of which has coupling points on at least one of the support chassis, backrest and seat for producing a synchronous adjustment of the backrest and seat in a manner causing the backrest to execute a superimposed tiltback and lowering motion from a highest upright sitting position into a lowest extended reclining position relative to the support chassis as an essentially pivoting motion around a pivot axis which is in front of the backrest and above the seat at an angle formed between the backrest and the seat, while the seat executes a slight superimposed sliding and lifting motion from the sitting position into the reclining position;

a support chassis mounting carrier which integrates all support chassis coupling points;

a backrest mounting carrier which integrates all backrest coupling points; and a seat mounting carrier which integrates all seat coupling points.

* * * * *